(12) United States Patent
Choi

(10) Patent No.: US 7,922,191 B2
(45) Date of Patent: Apr. 12, 2011

(54) AIRBAG CUSHION WITH MULTIPLE CHAMBERS

(75) Inventor: Hyeongho Choi, Gwangmyeong-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 147 days.

(21) Appl. No.: 12/323,358

(22) Filed: Nov. 25, 2008

(65) Prior Publication Data

US 2009/0152844 A1 Jun. 18, 2009

(30) Foreign Application Priority Data

Dec. 13, 2007 (KR) .................. 10-2007-0130036

(51) Int. Cl.
*B60R 21/233* (2006.01)

(52) U.S. Cl. ..................... 280/729; 280/743.2

(58) Field of Classification Search .......... 280/729, 280/731
See application file for complete search history.

(56) References Cited

U.S. PATENT DOCUMENTS

| | | | | |
|---|---|---|---|---|
| 3,752,501 A * | 8/1973 | Daniel et al. | .................. | 280/729 |
| 5,464,250 A * | 11/1995 | Sato | ............................. | 280/743.1 |
| 5,791,685 A * | 8/1998 | Lachat et al. | .............. | 280/743.1 |
| 5,845,935 A * | 12/1998 | Enders et al. | .............. | 280/743.2 |
| 5,906,391 A * | 5/1999 | Weir et al. | ...................... | 280/729 |
| 6,086,092 A * | 7/2000 | Hill | ................................ | 280/729 |
| 6,536,799 B2 * | 3/2003 | Sinnhuber et al. | ............ | 280/735 |
| 6,554,316 B2 * | 4/2003 | Schneider et al. | ......... | 280/743.1 |
| 7,025,164 B2 * | 4/2006 | Takimoto | ...................... | 180/274 |
| 7,066,487 B2 | 6/2006 | Sullivan et al. | | |
| 7,264,268 B2 * | 9/2007 | Ehrke | .......................... | 280/729 |
| 7,530,597 B2 * | 5/2009 | Bito | ............................ | 280/742 |
| 7,549,674 B2 * | 6/2009 | Yoshikawa et al. | .......... | 280/740 |
| 7,637,530 B2 * | 12/2009 | Yamaji et al. | .............. | 280/730.2 |
| 7,673,901 B2 * | 3/2010 | Hanawa et al. | ............ | 280/743.1 |
| 7,686,327 B2 * | 3/2010 | Heuschmid et al. | .......... | 280/729 |
| 7,793,973 B2 * | 9/2010 | Sato et al. | ................... | 280/730.2 |
| 2005/0098985 A1* | 5/2005 | Sullivan et al. | ............... | 280/729 |
| 2006/0175819 A1* | 8/2006 | Abe | .......................... | 280/743.2 |
| 2007/0200321 A1* | 8/2007 | Heitplatz et al. | ........... | 280/730.1 |
| 2010/0117340 A1* | 5/2010 | Hanawa et al. | ............... | 280/729 |

FOREIGN PATENT DOCUMENTS

| | | |
|---|---|---|
| JP | 2006-347279 | 12/2006 |
| JP | 2007-055577 | 3/2007 |
| KR | 10-2005-0082322 | 8/2005 |

* cited by examiner

*Primary Examiner* — Paul N Dickson
*Assistant Examiner* — Karen A Beck
(74) *Attorney, Agent, or Firm* — Morgan, Lewis & Bockius LLP

(57) ABSTRACT

An airbag cushion has multiple chambers of which the expansion order and speed are controlled. The airbag cushion can expand in a predetermined order at a predetermined speed to optimally protect a passenger. Therefore, the airbag cushion can rapidly expand between the steering wheel and the passenger, without injuring the passenger.

11 Claims, 12 Drawing Sheets

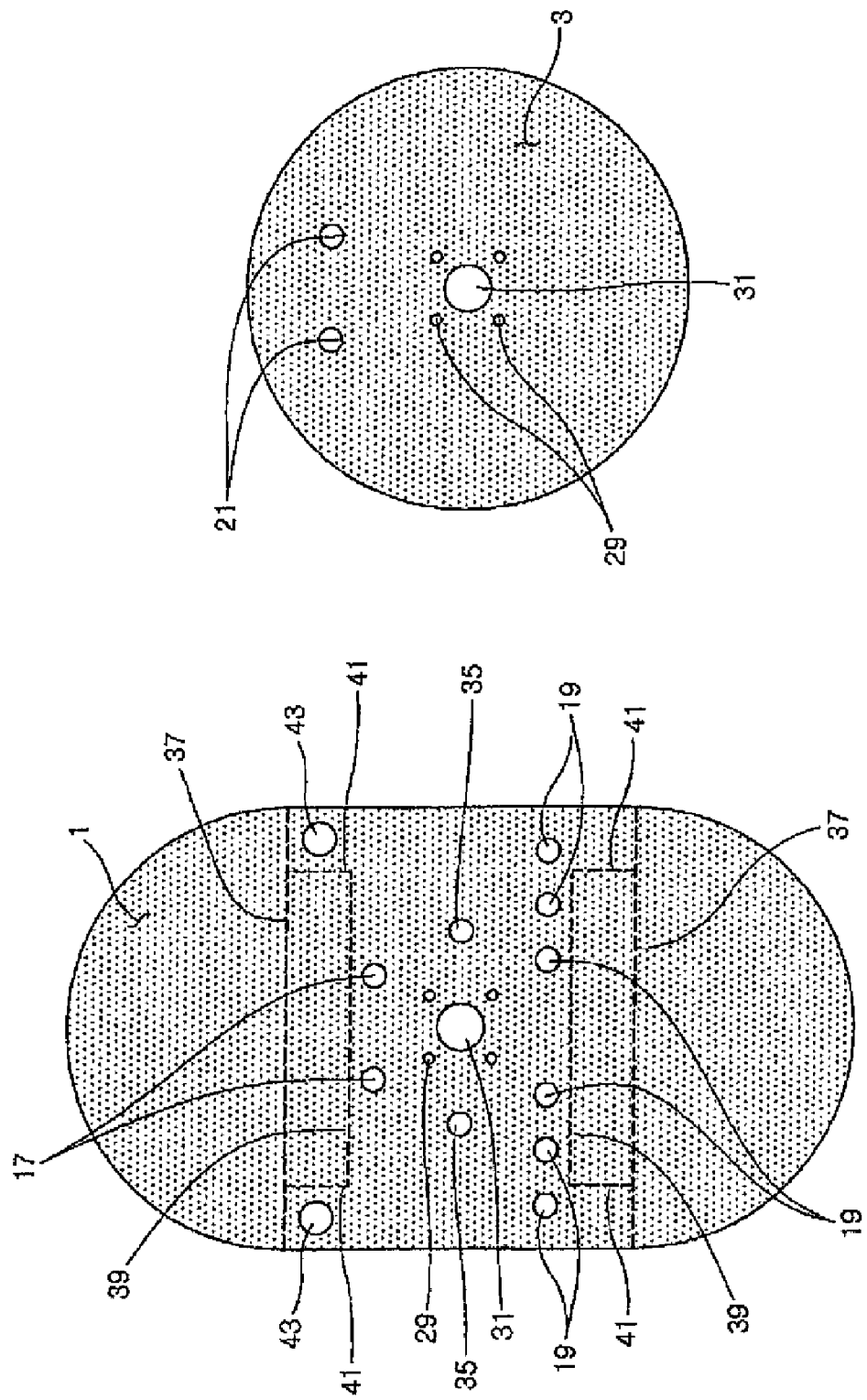

AIRBAG CUSHION WITH MULTIPLE CHAMBERS

CROSS-REFERENCE TO RELATED APPLICATION

The present application is based on, and claims priority from, Korean Application Number 10-2007-0130036 filed Dec. 13, 2007, the entire contents of which application is incorporated herein for all purposes by this reference.

BACKGROUND OF THE INVENTION

1. Field of the Invention

The present invention relates to an airbag that is used as a safety device in a vehicle, particularly an airbag cushion including multiple chambers inside.

2. Description of Related Art

An airbag cushion provided at the driver seat or the passenger seat generally has one chamber and a tether in the chamber to control the front-to-back size of the chamber.

An airbag cushion having this configuration expands by high-pressure inflator gas toward a passenger. The expansion speed is so fast that the passenger may be injured, particularly in the face and neck.

Further, an airbag cushion having one chamber as described above is insufficient to protect the passenger because it cannot expand sufficiently rapidly between the passenger and the steering wheel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various embodiments of the present invention provide for a structure of an airbag cushion with multi-chamber that allows an airbag to expand in a predetermined order at a predetermined speed to optimally protect a passenger by setting the expansion order and speed of the chambers different, such that the airbag can rapidly expand between the passenger and the steering wheel, without hitting and hurting the passenger.

One aspect of the present invention provides an airbag cushion with multiple chambers including an inner chamber that is connected to directly receive inflation gas from an inflator, and/or a first chamber and a second chamber that are connected to the inner chamber to respectively receive the inflation gas from the inner chamber, wherein at least one vent hole is formed on the boundary of the inner chamber such that the amount of inflation gas supplied to the second chamber is larger than the amount of inflation gas supplied to the first chamber.

In various embodiments, a first inner vent hole and a second inner vent hole may be formed on the boundary of the inner chamber, the first vent hole allowing inflation gas to pass into the first chamber and the second vent hole allowing inflation gas to pass into the second chamber.

In some aspects, the airbag cushion further may include a diffuser and an airbag module housing including an inflator, wherein the inner chamber, the first chamber, and the second chamber are formed by a cushion sheet making a single closed surface, the inner chamber is formed by a portion of the cushion sheet recessed from the front portion of the airbag cushion and toward the inside of the airbag cushion, the portion of the cushion sheet that overlaps to form the inner chamber forms a tether, the diffuser is located inside the inner chamber, and/or the diffuser passes through the cushion sheet at least two times and is connected to the inflator.

In various embodiments, at least one outer vent hole facing the outside of the airbag cushion may be formed on the boundary of the first chamber, the second inner vent hole may be larger than the first inner vent hole, the first chamber may be positioned at the upper portion of the airbag cushion, the second chamber may be positioned at the lower portion of the airbag cushion, and/or the inner chamber may be positioned at the center of the airbag cushion.

In various embodiments, a cross-section of the inner chamber may be rectangular and cross the center of a circle constructed by the outline of the airbag cushion sheet, when seen from the opposite side of the inflator.

In various embodiments, a cross-section of the inner chamber may have the shape of two trapezoids whose shorter bases coincide, when seen from the opposite side of the inflator.

In various embodiments, a cross-section of the inner chamber may have the shape of two trapezoids whose longer bases coincide, when seen from the opposite side of the inflator.

In various embodiments, the cushion sheet may be formed by attaching a first cushion sheet forming the front portion of the airbag cushion and the inner chamber to a second cushion sheet forming the rear portion of the airbag cushion, the inner chamber runs from one edge of the first cushion sheet to the opposite edge;

and at least one of the ends of the inner chamber is closed by attaching the first cushion sheet with the second cushion sheet.

In various embodiments, the cushion sheet is formed by combining a first cushion sheet forming the front portion of the airbag cushion and the inner chamber with a second cushion sheet forming the rear portion of the airbag cushion sheet, the inner chamber runs from one edge of the first cushion sheet to the opposite edge, a first end of the inner chamber is closed by sewing the edges of the first cushion sheet defining the first end, and/or an inner vent hole allowing gas to pass to the first chamber and the second chamber is formed by partially sewing closed the second end of the inner chamber.

In various embodiments, the boundary of the inner chamber further includes additional first inner vent holes, second inner vent holes, and a third inner vent hole facing a gap at a portion where the cushion sheet overlaps around the portion where the diffuser is disposed, to supply the inflation gas simultaneously to the first chamber and the second chamber, the first inner vent holes and the second inner vent holes are formed in the same size, and/or the number of the second inner vent holes is larger than the number of the first inner vent holes.

In various embodiments, the first cushion sheet further includes a fourth inner vent hole, first sewing lines, second sewing lines and third sewing lines, a tether is formed by overlapping a portion of the first cushion sheet and sewing together first sewing lines, sewing together second sewing lines and sewing together third sewing lines, an overlapping portion of the first cushion sheet is sewn along the entire length of the inner chamber, the second sewing lines are shorter than the first sewing lines at both ends, are parallel with the first sewing lines and are positioned away from the first sewing lines toward the inner chamber, the third sewing lines run perpendicular to and intersect the second sewing lines and the first sewing lines, and the fourth inner vent hole is surrounded on three sides by the outlines of the first sewing line, the third sewing line, and an edge of the first cushion sheet to supply the inflation gas into the first chamber.

In various embodiments, the first chamber and the second chamber are formed by attaching a first cushion sheet forming the front portion of the airbag cushion and the inner chamber to a second cushion sheet forming the rear portion of the airbag cushion sheet, the inner chamber is formed by an inner cushion that crosses the inside of the airbag cushion while making a closed surface independent from the airbag cushion, and/or at least one of the ends of the inner cushion is attached to a portion where the first cushion sheet is attached to the second cushion sheet.

In various aspects of the present invention an airbag cushion with multiple chambers, includes an inner chamber that is connected to directly receive inflation gas from an inflator, and/or a first chamber and a second chamber that are connected to the inner chamber to respectively receive the inflation gas from the inner chamber, wherein first inner vent holes and second inner vent holes having the same size are formed on the boundary of the inner chamber to supply inflation gas into the first chamber and the second chamber, respectively, the first chamber and the second chamber are disposed at both left and right sides of the airbag cushion, and/or the inner chamber runs from the top to the bottom of the airbag cushion between the first chamber and the second chamber.

In various embodiments, the inner chamber, the first chamber, and the second chamber are formed by attaching a first cushion sheet to a second cushion sheet to form a cushion space therein, the center of the first cushion sheet is recessed away from the outside of the airbag cushion to form the inner chamber such that the cushion space is divided by the inner chamber into the first chamber and the second chamber, the first cushion sheet overlaps between the inner chamber and the first cushion sheet such that the inner chamber is blocked from the outside, the overlapping portion of the first cushion sheet functions as a tether, and/or inflation height of the airbag cushion is adjusted by the length of the inner chamber and the tether, and an outer vent hole facing the outside of the airbag cushion is formed at a portion where the second cushion sheet contacts the inner chamber.

In various aspects of the present invention, an airbag cushion with multiple chambers includes a first cushion sheet and a second cushion sheet attached to form a cushion space therein and two inner chambers are formed by depressing along a first axis crossing the center of the first cushion sheet and then along a second axis crossing the center of the first cushion sheet and running perpendicular to the first axis, wherein the cushion space is divided into four spaces by the two inner chambers perpendicularly crossing each other, the inner chambers are connected to directly receive inflation gas from an inflator, and the four spaces divided by the two inner chambers receive the inflation gas from the inner chambers.

In various aspects, an airbag cushion has multiple chambers of which the expansion order and speed are controlled. The airbag cushion can expand in a predetermined order at a predetermined speed to optimally protect a passenger. Therefore, the airbag cushion can rapidly expand between the steering wheel and the passenger, without injuring the passenger.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 19 and 20 are views of exemplary airbag cushions according to the present invention.

DETAILED DESCRIPTION OF THE INVENTION

Figure 1:
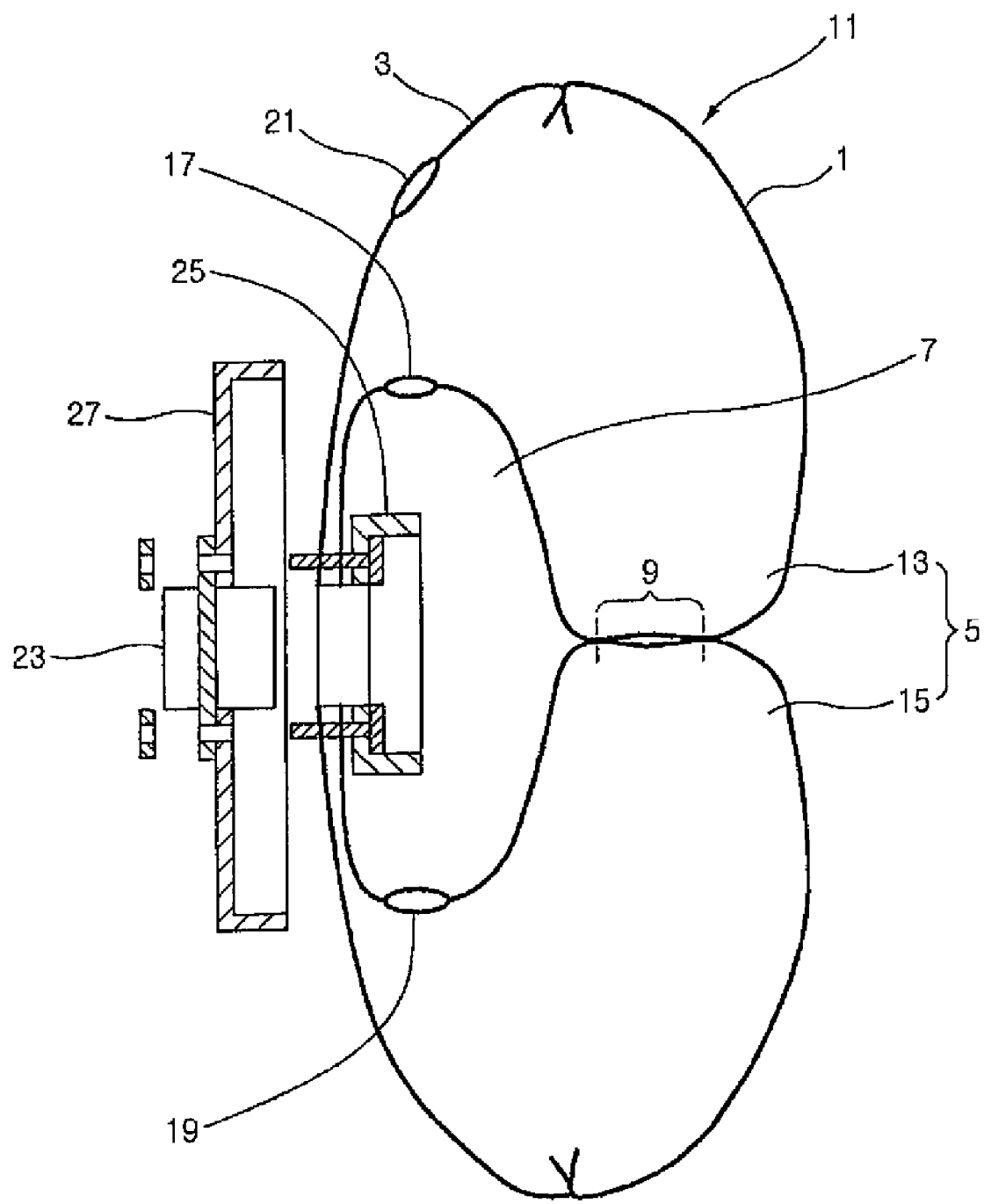
FIG. 1 is a view showing an exemplary airbag cushion with multiple chambers according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIGS. 1 to 7, according to various embodiments of the present invention, a first cushion sheet 1 and a second cushion sheet 3 are attached to form a cushion space 5 inside. An inner chamber 7 is recessed from the outside to the inside at the center portion of the first cushion sheet such that cushion space 5 is divided by inner chamber 7.

First cushion sheet 1 attached to second cushion sheet 3 forms a cushion sheet having a single closed surface. First cushion sheet 1 is disposed at the front portion of the airbag cushion, toward a passenger, and second cushion sheet 3 is disposed at the opposite side, toward an inflator. The edges of first cushion sheet 1 and second cushion sheet 3 are sewn to form the outline of the airbag cushion.

First cushion sheet 1 is plied causing two portions of the sheet to overlap, forming inner chamber 7, which is isolated from the outside. The overlapping portion of first cushion sheet 1 functions as a tether 9.

The overlapping portion of first cushion sheet 1 that forms tether 9 is sewn at least from inner chamber 7 and the outer surface of cushion sheet 1, respectively.

It may be possible to sew other portions to increase the strength of tether 9 and to change the length of tether 9, the size and shape of inner chamber 7 and expansion characteristics of airbag cushion 11.

Cushion space 5 is divided into a first chamber 13 and a second chamber 15 by inner chamber 7. First inner vent holes 17 are formed to connect inner chamber 7 with first chamber 13, that is, the inner vent holes lie on the boundary between inner chamber 7 and first chamber 13. Second inner vent holes 19 are formed to connect inner chamber 7 with second chamber 15. Outer vent holes 21 that are open to the outside are formed at the boundary of first chamber 13.

In various embodiments, a second inner vent hole 19 is larger than a first inner vent hole 17 and inner chamber 7 is formed in a rectangular shape, which crosses the center of a circle constructed by the outline of first cushion sheet 1, when seen from first cushion sheet 1.

Further, in various embodiments, cushion space 5 is divided into similarly sized sections by inner chamber 7 such that first chamber 13 is disposed at the upper portion of airbag cushion 11 and second chamber 15 is disposed at the lower portion of airbag cushion 11.

In various embodiments, dividing cushion space 5 by an inner chamber does not mean that different chambers of cushion space 5 are completely sealed off from each other. Cushion space 5 thus can be considered as a large volume having at least two sections that are not substantially isolated from each other. That is, as shown in FIG. 1, first chamber 13 and second chamber 15 of cushion space 5 divided by inner chamber 7 are connected such that gas can practically flow through a gap between inner chamber 7 and second cushion sheet 3.

In various embodiments, first cushion sheet 1 forms the front portion of airbag cushion 11, facing a passenger, and second cushion sheet 3 forms the rear portion of airbag cushion 11, facing an inflator 23.

In various embodiments, it may be possible that first cushion sheet 1 forms the rear portion of airbag cushion 11, facing inflator 23, and second cushion sheet 3 forms the front portion of airbag cushion 1, facing a passenger.

A diffuser 25, disposed inside inner chamber 7, is connected with inflator 23, which is fastened to an airbag module housing 27, through first cushion sheet 1 and second cushion sheet 3.

Figure 2:
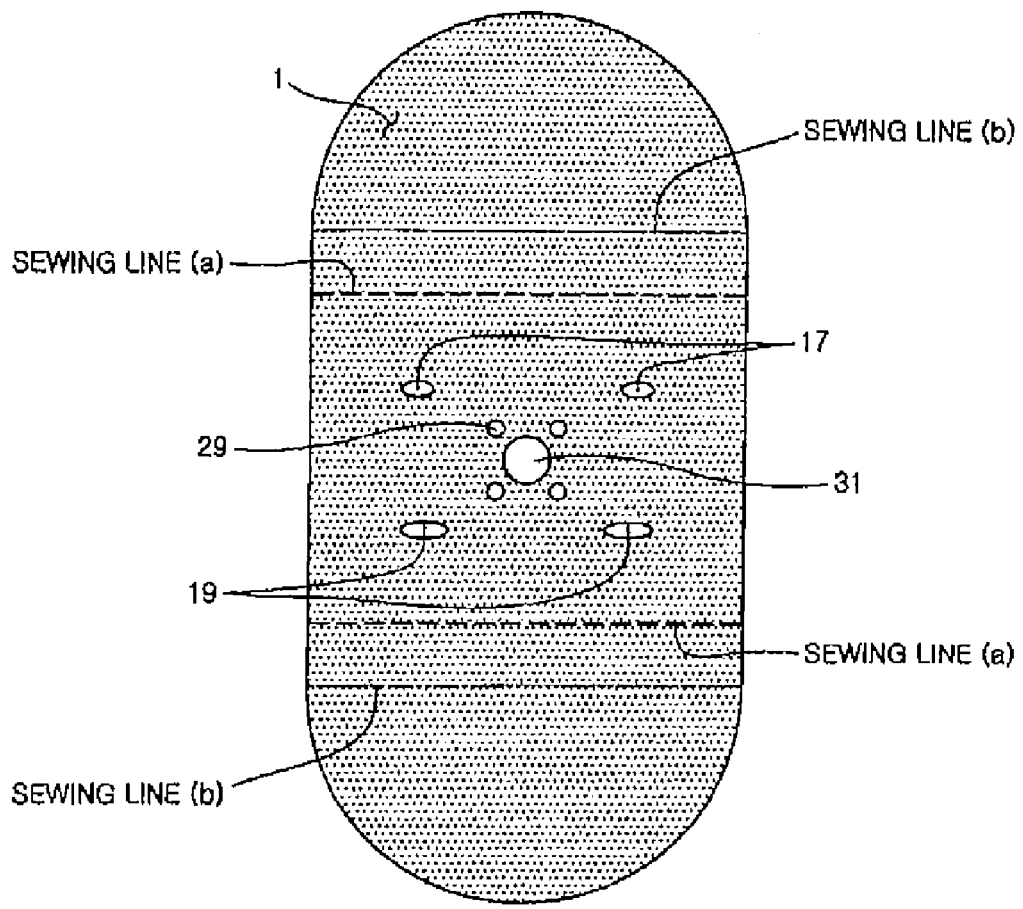
FIG. 2 is a development view of an exemplary first cushion sheet of the airbag cushion shown in FIG. 1.

FIG. 2 is a development view of first cushion sheet 1, in which fixing bolt holes 29 for fastening diffuser 25 to airbag module housing 27 and an inflator connection hole 31 for connecting diffuser 25 to inflator 23 are formed at the center portion. Further, first inner vent holes 17 are formed above fixing bolt holes 29, second inner vent holes 19 are formed under fixing bolt holes 29, and sewing lines for forming tether 9 lie above first inner vent hole 17 and under second inner vent holes 19.

Figure 3:
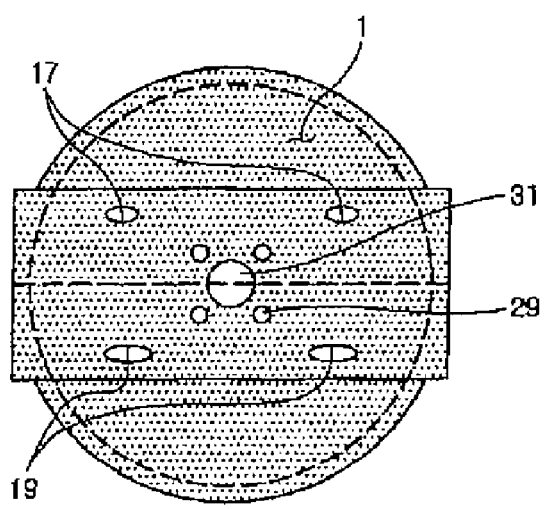
FIG. 3 is a view showing the first cushion sheet shown in FIG. 2, which is sewn.
Figure 4:
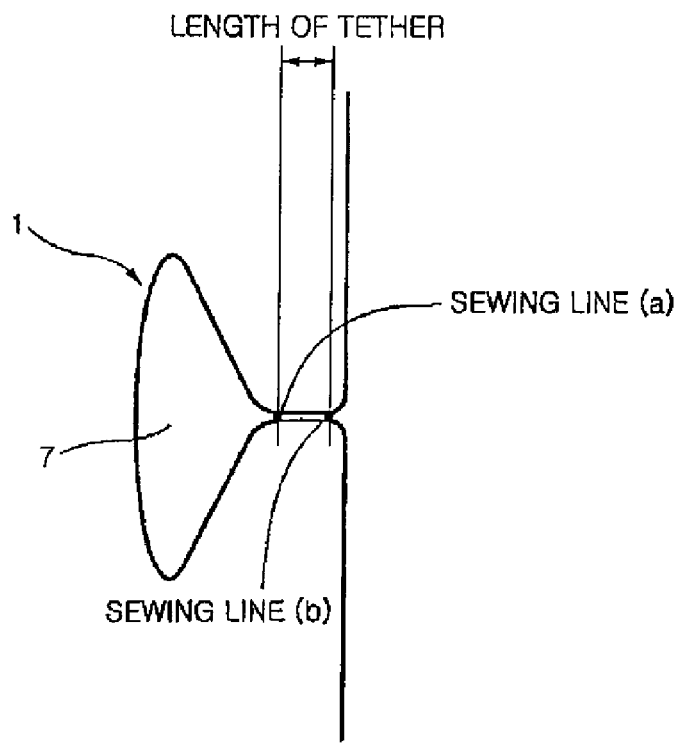
FIG. 4 is a left side view of FIG. 3.

The shape shown in FIG. 3 is obtained by sewing corresponding sewing lines (a), (b), respectively. The length between the two lines (a) and (b) is the tether's length as shown in FIG. 4 and consequently the portion between the sewing lines (a) forms inner chamber 7.

Figure 5:
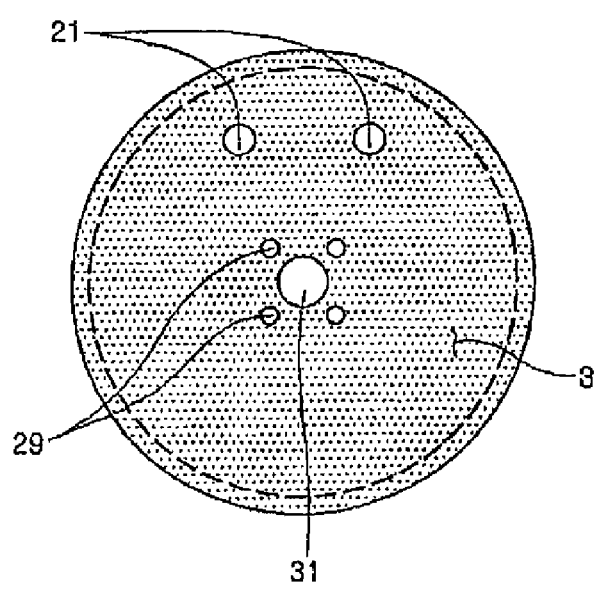
FIG. 5 is a development view of an exemplary second cushion sheet of the airbag cushion shown in FIG. 1.

FIG. 5 is a development view of second cushion sheet 3 that can be connected with first cushion sheet 1 to form cushion space 5, in which fixing bolt holes 29 and inflator connection hole 31 that are connected with fixing bolt holes 29 and inflator connection hole 31 of first cushion sheet 1 are formed at the center portion. For reference, fixing bolt holes 29 and inflator connection hole 31 are referred by the same names and reference numbers as those of first cushion sheet 1.

Outer vent holes 21 are formed above fixing bolt holes 29 and inflator connection hole 31 of second cushion sheet 3.

Figure 6:
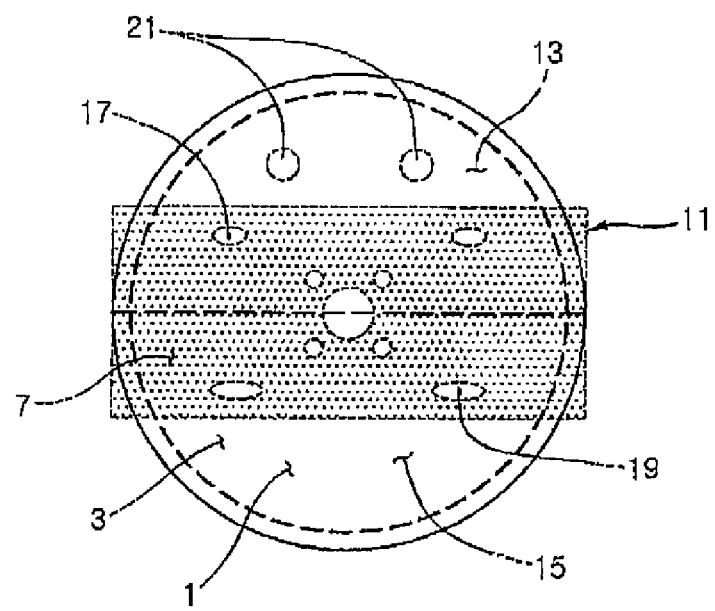
FIG. 6 is a view showing the airbag cushion shown in FIG. 1, facing the first cushion sheet.

Airbag cushion 11 shown in FIG. 6 is completed by overlapping first cushion sheet 1 and second cushion sheet 3 and then sewing them around the edge.

Inner chamber 7 runs from one edge of the first cushion sheet to the opposite edge. Both ends inner chamber 7 are closed where first cushion sheet 1 and second cushion sheet 3 are connected.

Figure 7:
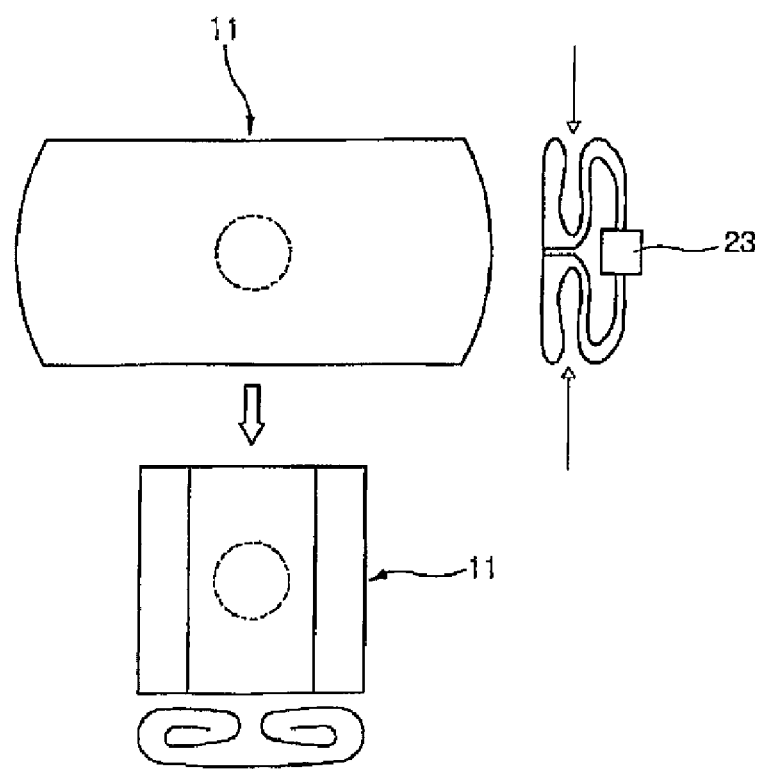
FIG. 7 is a view illustrating folding the airbag cushion shown in FIG. 6 to mount the airbag cushion.

Airbag cushion 11 formed as shown in FIG. 6 is folded as shown in FIG. 7 and then mounted.

That is, as shown at the upper portion of FIG. 7, airbag cushion 11 is folded in a rectangular shape having substantially the same size as inner chamber 7 by pushing the upper portion of first chamber 13 to the center portion between inner chamber 7 and first cushion sheet 1 and the lower portion of second chamber 15 to the center portion between inner chamber 7 and first cushion sheet 1, and then the rectangle is folded or rolled at both ends into a substantially square shape to be mounted.

Figure 8:
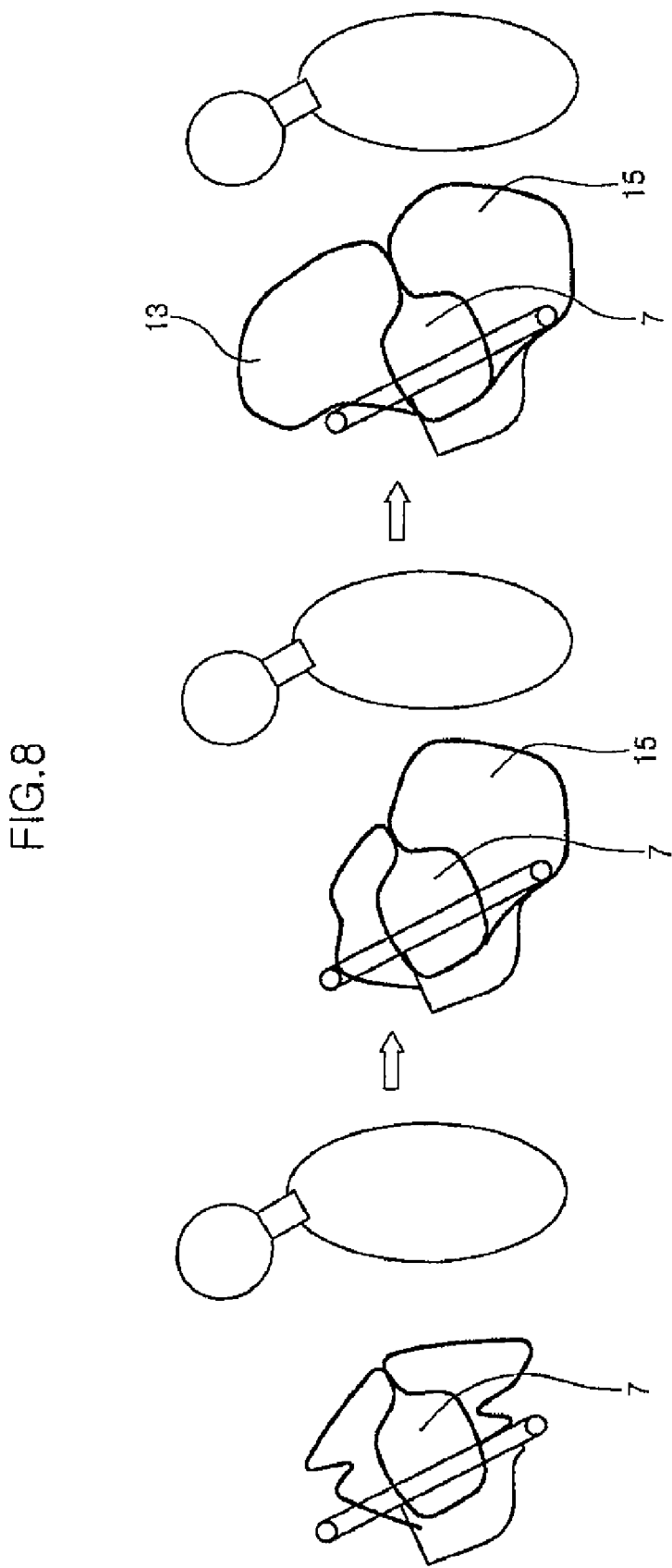
FIG. 8 is a view sequentially illustrating expansion of the airbag cushion shown in FIG. 1.

The operation of the airbag cushion having the above configuration according to various embodiments of the present invention is described hereafter with reference to FIG. 8.

As inflator 23 is actuated, inner chamber 7 directly connected to inflator 23 first expands as shown on the left of FIG. 8.

Inflation gas of inner chamber 7 is supplied into first chamber 13 and second chamber 15 through first inner vent holes 17 and second inner vent holes 19 respectively, but because second inner vent holes 19 are larger than first inner vent holes 17, second chamber 15 fully expands first as shown in the center of FIG. 8, followed by full expansion of first chamber 13 as shown on the right of FIG. 8.

That is, when airbag cushion 11 is mounted in the steering wheel, after inner chamber 7 expands, second chamber 15 at the lower portion fully expands first between the steering wheel and the driver's chest to effectively prevent impact between the steering wheel and the driver. Further, since airbag cushion 11 is controlled such that the parts sequentially expand as described above, it is possible to maximize the protection performance of the airbag.

Figure 9:
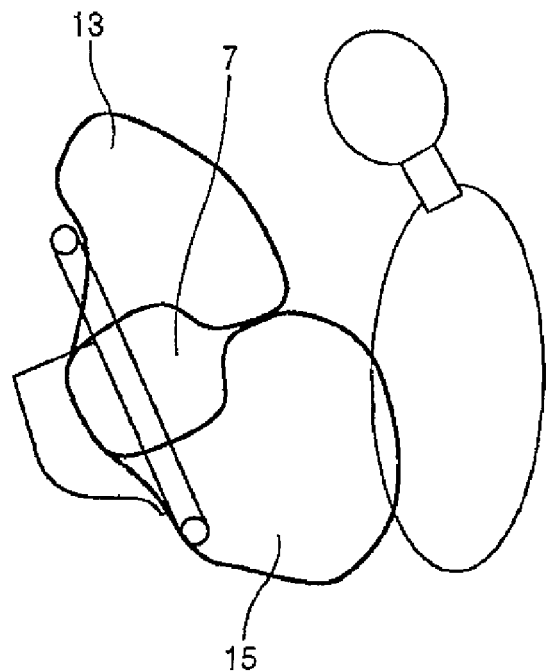
FIG. 9 is a view showing an exemplary modification of the airbag cushion shown in FIG. 1, in which a second chamber is increased in size.
Figure 10:
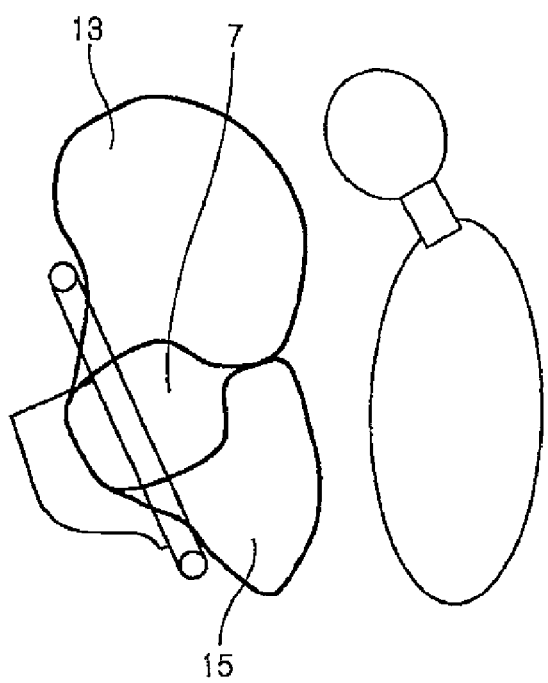
FIG. 10 is a view showing an exemplary modification of the airbag cushion shown in FIG. 1, in which a first chamber is increased in size.

Cushion space 5 may be divided into sections having different sizes. FIG. 9 shows an example in which second chamber 15 at the lower potion is larger than first chamber 13 at the upper portion. FIG. 10 shows another example in which first chamber 13 at the upper portion is larger than second chamber 15 at the lower portion.

The structure shown in FIG. 9 may be useful to increase protection of the chest, for example, in instances where a passenger does not fasten his or her seat belt. The structure shown in FIG. 10 may be useful to increase protection of the head, for example, in instances where a passenger does fasten his or her seat belt.

Figure 11:
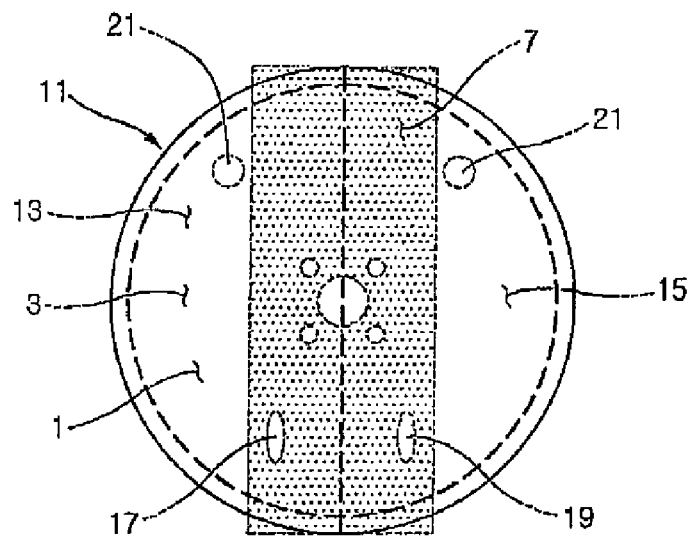
FIG. 11 is a view of the airbag cushion according to various aspects of the present invention.

According to various embodiments of the present invention such as shown in FIG. 11, second chamber 15 also has outer vent holes 21 that are open to the outside, first inner vent hole 17 is the same in size as second inner vent hole 19, first chamber 13 and second chamber 15 are disposed at the left and right sides of airbag cushion 11, respectively, and the length of inner chamber 7 runs from the top of the airbag cushion to the bottom.

That is, in various embodiments of the present invention, the length of inner chamber 7 runs from the top of the airbag cushion to the bottom, and first chamber 13 and second chamber 15 are disposed to the left and to the right of inner chamber 7.

Figure 12:
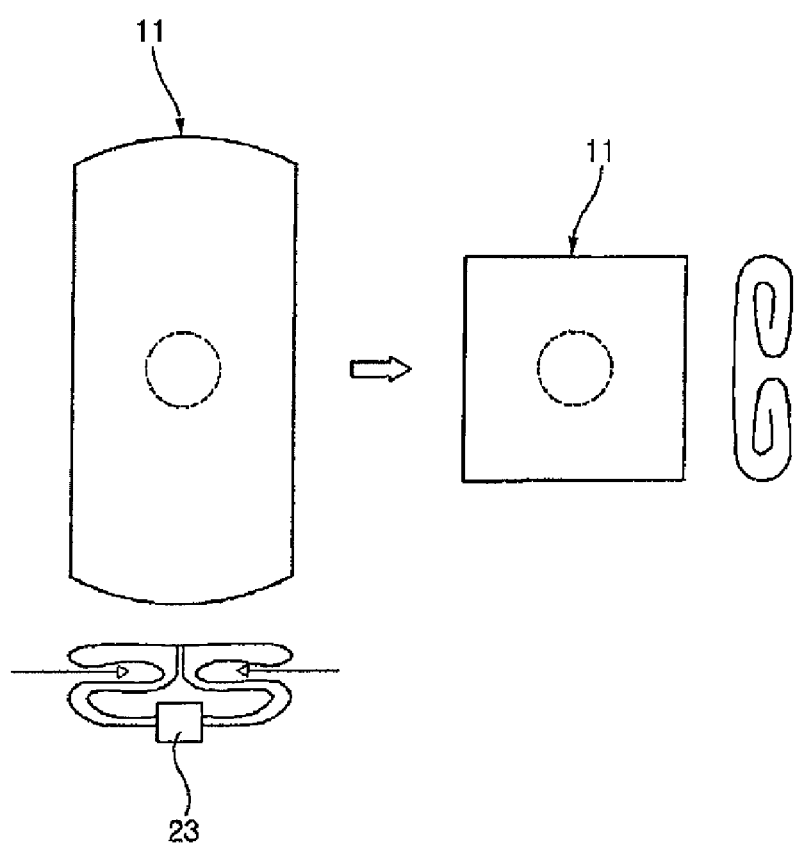
FIG. 12 is a view illustrating exemplary folding the airbag cushion shown in FIG. 11 to mount the airbag cushion.

Airbag cushion 11 having this configuration is also folded in a substantially square shape to be mounted, by first pushing both sides of first chamber 13 and second chamber 15 to the center portion between inner chamber 7 and first cushion sheet 1, in a rectangular shape that is similar to inner chamber 7 as shown at the left in FIG. 12 and then folding or rolling the upper and lower sides of the rectangle to the center portion, as shown at the right in FIG. 12.

As airbag cushion 11 expands, inner chamber 7 first expands such that the chest-sided portion and the upper portion thereof expand, and then first chamber 13 and second chamber 15 at the left and right sides simultaneously expand.

Figure 13:
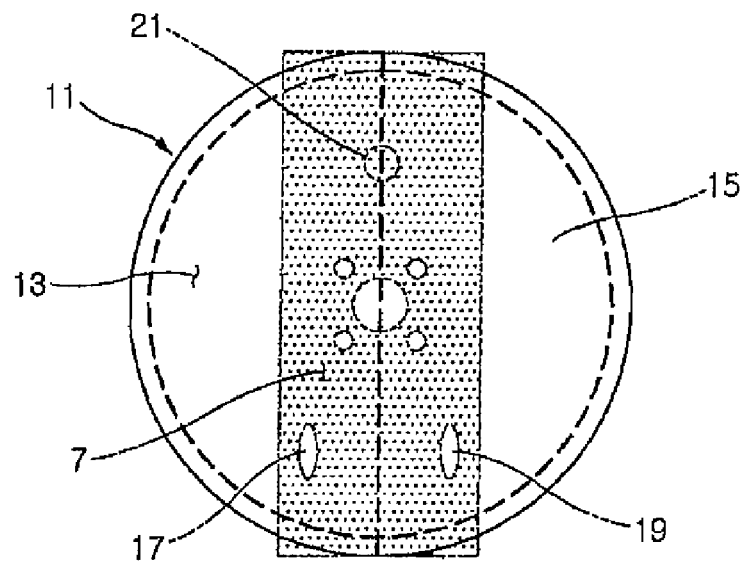
FIGS. 13 to 17 are views of exemplary airbag cushions according to the present invention.

FIG. 13 shows that in various embodiments, cushion space 5 is divided into first chamber 13 and second chamber 15 by inner chamber 7, first inner vent hole 17 is formed to connect inner chamber 7 with first chamber 13, second inner vent hole 19 is formed to connect inner chamber 7 with second chamber 15, and outer vent hole 21 that is open to the outside is formed where second cushion sheet 3 contacts with inner chamber 7.

That is, various embodiments such as shown in FIG. 13 may be similar to other aspects such as shown in FIG. 11, except that outer vent hole 21 is positioned where second cushion sheet 3 contacts inner chamber 7, i.e. behind inner chamber 7.

According to various embodiments, first inner vent hole 17 is the same in size as second inner vent hole 19, first chamber 13 and second chamber 15 are disposed at the left and right sides of airbag cushion 11, respectively, and the length of inner chamber 7 runs from the top of the airbag cushion to the bottom.

Therefore, in the early stages of expansion, outer vent hole 21 is obstructed by the wall of inner chamber 7, such that discharge of inflation gas out of the airbag cushion is reduced. Further, the inflator gas is allowed to discharge toward outside when the internal pressure of airbag cushion is increased by impact with passenger. Therefore, it is expected that airbag cushion 11 will be able to more rapidly expand in various embodiments of the present invention.

According to various aspects, the length of inner chamber 7 runs from top to bottom, at least one end of inner chamber 7 is independently closed, regardless of how first cushion sheet 1 and second cushion sheet 3 are connected.

Figure 14:
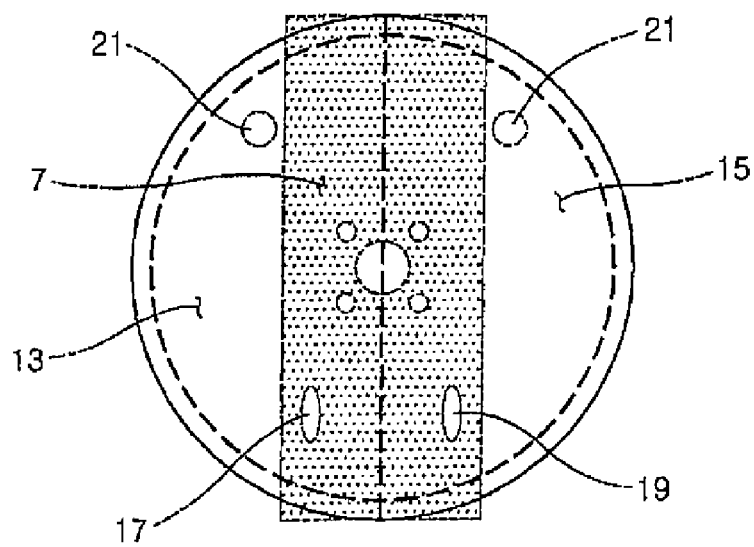

In FIG. 14, both ends of inner chamber 7 are independently closed, such as by sewing, regardless of how first cushion sheet 1 and second cushion sheet 3 are connected. That is, both longitudinal ends of inner chamber 7 may be closed by sewing regardless of first cushion sheet 1 and second cushion sheet 3.

Further, according to various embodiments of the present invention, at least one end of longitudinal overlapped ends of the first cushion forming the inner chamber may be independently closed, regardless of the portion where the first cushion sheet and the second cushion sheet are connected. In various embodiments it is thus possible to form an inner vent hole that is communicated with cushion space 5 by adjusting the sewing length. That is, by partially sewing the portion where the space of inner chamber 7 is separated from the cushion chambers such that inner chamber 7 is partially open, the opened portion can be used as an inner vent hole.

Figure 15:
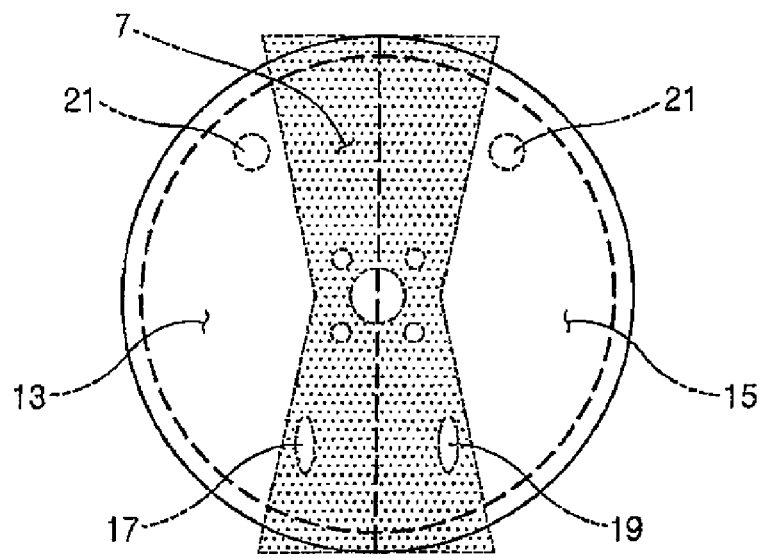

FIG. 15 shows various aspects of the present invention, in which inner chamber 7 has a cross-section delineated by two trapezoids coinciding along their shorter bases such that the center portion of a circle constructed by the outline of first cushion sheet 1 is recessed inside, when seen from first cushion sheet 1.

Figure 16:
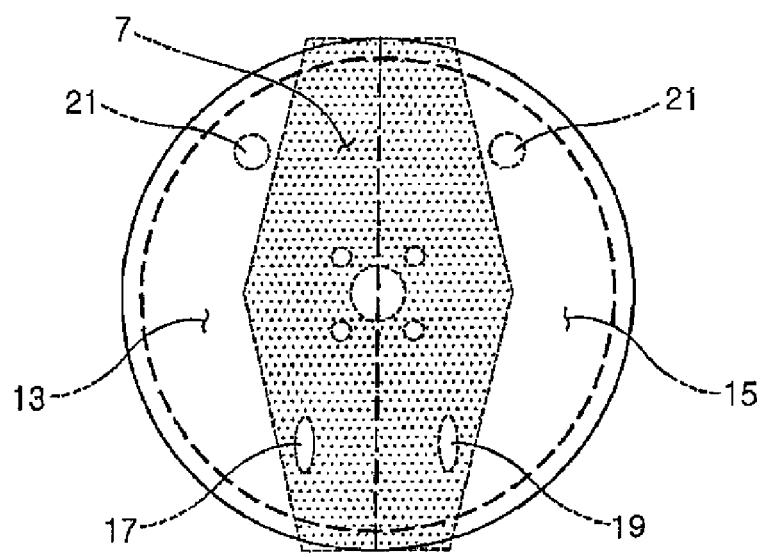

FIG. 16 shows another embodiment of the present invention, in which inner chamber 7 has a cross section delineated by two trapezoids coinciding along their longer bases such that the center portion of a circle constructed by the outline of first cushion sheet 1 protrudes outside, when seen from first cushion sheet 1.

That is, as shown in FIGS. 15 and 16, it is possible to change expansion characteristics of the airbag cushion by changing the shape of the cross-section of inner chamber 7.

Figure 17:
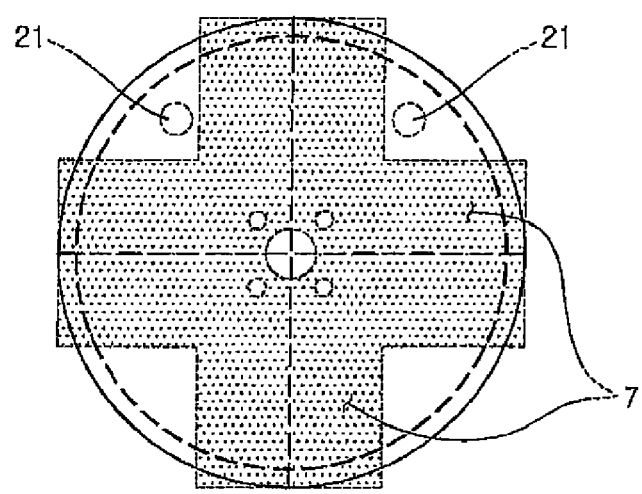
Figure 18:
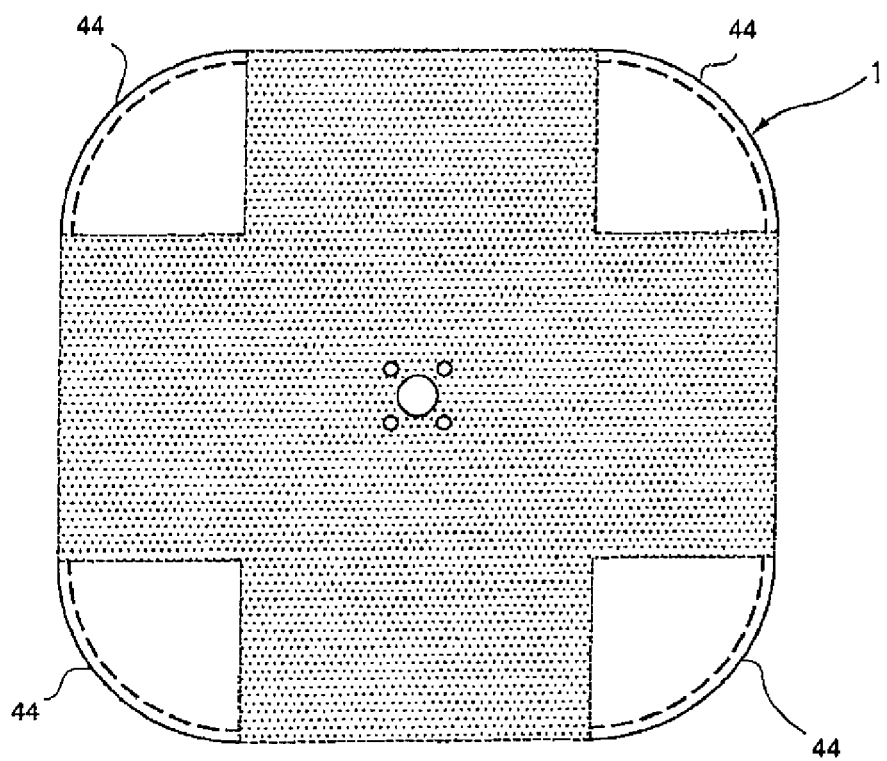
FIG. 18 is a development view of a first cushion sheet shown in FIG. 17.

FIGS. 17 and 18 show various embodiments of the present invention in which the center portion of first cushion sheet 1 is first recessed and overlaps itself and then is additionally vertically recessed and overlaps itself such that inner chambers 7 recessed from the outside to the inside vertically cross each other. That is, first cushion sheet 1 is depressed along a first axis crossing the center of the sheet and then along a second axis crossing the center of the sheet and running perpendicular to the first axis. Therefore, cushion space 5 is divided into four sections by two inner chambers 7 crossing each other.

FIG. 18 is a development view, in which inner chamber 7 is formed inside by contacting the parallel edges of quarter-circles 44 with each other so as to form a full circle centered on the center of first cushion sheet 1. Thereafter, the airbag cushion shown in FIG. 17 is obtained by sewing second cushion sheet 3 with the edges.

Outer vent holes 21 formed through second cushion sheet 3 can be seen in FIG. 17.

Figure 19:
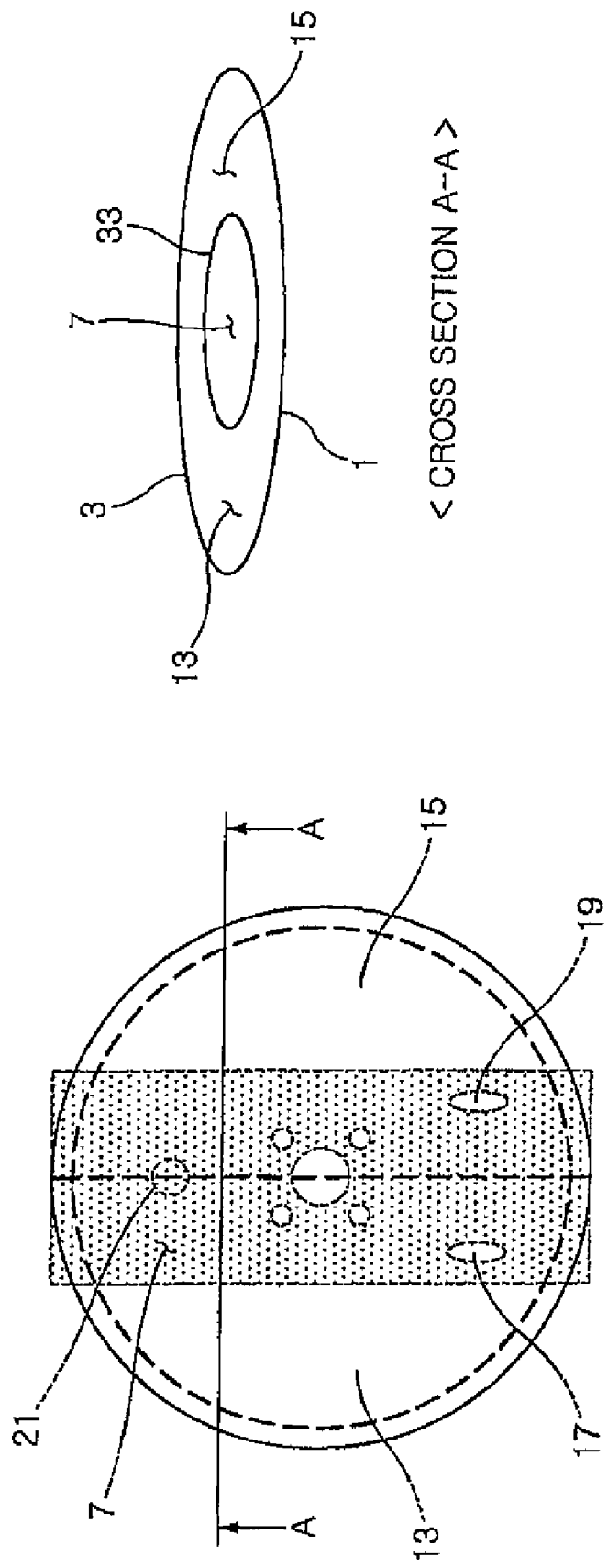

Further, FIG. 19 shows that various aspects in which inner chamber 7 is not formed by first cushion sheet 1 or second cushion sheet 3, and first cushion sheet 1 and second cushion sheet 3 are connected to form cushion space 5 inside. An inner cushion 33 is disposed inside cushion space 5 to form an independent inner chamber 7 inside cushion space 5.

At least one of the ends of inner cushion 33 may be connected where first cushion sheet 1 and second cushion sheet 3 are connected, and both ends are connected by sewing in FIG. 19.

FIG. 20 shows various aspects of the present invention in which a first cushion sheet 1 and a second cushion sheet 3 are developed. First cushion sheet 1 is folded and sewn to form an inner chamber 7 and the edge is connected with second cushion sheet 3. Accordingly, an airbag cushion, which has inner chamber 7 directly receiving inflation gas from inflator 23 and first chamber 13 and a second chamber 15 receiving inflation gas through first inner vent holes 17 and second inner vent holes 19 from inner chamber 7, can be achieved.

Third inner vent holes 35 facing the gap between inner chamber 7 and second cushion sheet 3 are further formed in inner chamber 7 to supply inflation gas simultaneously to first chamber 13 and second chamber 15. First inner vent holes 17 and second inner vent holes 19 are formed in the same size, and the number of second inner vent holes 19 is larger than that of first inner vent holes 17.

Therefore, the chambers of the airbag cushion inflate in the following order: inner chamber 7, second chamber 15, and first chamber 13. Second chamber 15 is disposed at the lower portion of the airbag cushion and to relatively quickly absorb the shock due to contact with a passenger's chest and abdomen and first chamber 13 gradually and smoothly absorbs the shock due to contact with the passenger's head and neck.

The part functioning as tether 9 of the first cushion sheet 1 is formed by first sewing lines 37 where the folded portion of first cushion sheet 1 is sewn along the entire length of inner chamber 7. Second sewing lines 39, which are shorter than first sewing lines 37, run parallel to and are positioned away from first sewing lines 37 and toward the inflator connection hole 31. Third sewing lines 41 run perpendicularly between second sewing lines 39 and first sewing lines 37.

That is, first sewing line 37, second sewing line 39, and third sewing line 41 form a hat shape. The upper portion of the hat faces the center of first cushion sheet 1. The hat shapes are aligned and sewn.

Fourth inner vent holes 43 are further formed at a portion of inner chamber 7 of which three sides are surrounded by the outlines of first sewing line 37, third sewing line 41, and the edge of first cushion sheet 1 to supply the inflation gas into first chamber 13.

Fourth inner vent holes 43 allow the pressure of the inflation gas to be directly transmitted to both sides, not the center portion, of first chamber 13, such that the pressure to a passenger's head and neck at the center portion of first chamber 13 is relatively smaller than the pressure at the sides. Accordingly, it is possible to increase shock-absorbing effect.

As described above, the basic operation of the various embodiments shown in FIGS. 11 to 20 may not be different from that of the embodiments shown in FIGS. 1 to 8. That is, in various embodiments, airbag cushion 11 is divided into a plurality of chambers by forming inner chamber 7 in airbag cushion 11. Thus, the order and rate of expansion of the chambers can be controlled, such that as airbag cushion 11 expands, it is possible to control the manner in which a passenger contacts the airbag cushion. Further, it is possible to prevent or reduce injury due to impact on the passenger's body.

For convenience in explanation and accurate definition in the appended claims and the specification, the terms "upper," "lower," "front," "rear," "inside," "outside," "left," "right" and the like are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag cushion with multiple chambers comprising:
   an inner chamber that is connected to directly receive inflation gas from an inflator; and
   a first chamber and a second chamber that are connected to the inner chamber respectively to receive the inflation gas from the inner chamber;
      wherein at least one vent hole is formed on a boundary of the inner chamber such that the amount of inflation gas supplied to the second chamber is larger than the amount of inflation gas supplied to the first chamber,
      wherein the inner chamber is inflatable by receiving the inflation gas,
      wherein a first inner vent hole and a second inner vent hole are formed on the boundary of the inner chamber, the first vent hole allowing inflation gas to pass into the first chamber and the second vent hole allowing inflation gas to pass into the second chamber; and
   a diffuser and an airbag module housing comprising an inflator;
      wherein the inner chamber, the first chamber, and the second chamber are formed by a cushion sheet making a single closed surface;
      wherein the inner chamber is formed by a portion of the cushion sheet recessed from the front portion of the airbag cushion and toward the inside of the airbag cushion;
      wherein a portion of the cushion sheet overlaps to form the inner chamber and a tether;
      wherein the diffuser is located inside the inner chamber; and
      wherein the diffuser passes through the cushion sheet at least two times and is connected to the inflator.

2. The airbag cushion as defined in claim 1, wherein at least one outer vent hole facing the outside of the airbag cushion is formed on the boundary of the first chamber;
   the second inner vent hole is larger than the first inner vent hole;
   the first chamber is positioned at the upper portion of the airbag cushion;
   the second chamber is positioned at the lower portion of the airbag cushion; and
   the inner chamber is positioned at the center of the airbag cushion.

3. The airbag cushion as defined in claim 1, wherein a cross-section of the inner chamber is rectangular and crosses the center of a circle constructed by the outline of the airbag cushion sheet, when seen from the opposite side of the inflator.

4. The airbag cushion as defined in claim 1, wherein a cross-section of the inner chamber has the shape of two trapezoids whose shorter bases coincide, when seen from the opposite side of the inflator.

5. The airbag cushion as defined in claim 1, wherein a cross-section of the inner chamber has the shape of two trapezoids whose longer bases coincide, when seen from the opposite side of the inflator.

6. The airbag cushion as defined in claim 1, wherein the cushion sheet is formed by attaching a first cushion sheet forming the front portion of the airbag cushion and the inner chamber to a second cushion sheet forming the rear portion of the airbag cushion;
   the inner chamber runs from one edge of the first cushion sheet to the opposite edge;
   and at least one of the ends of the inner chamber is closed by attaching the first cushion sheet to the second cushion sheet.

7. The airbag cushion as defined in claim 1, wherein the cushion sheet is formed by combining a first cushion sheet forming the front portion of the airbag cushion and the inner chamber with a second cushion sheet forming the rear portion of the airbag cushion sheet;
   the inner chamber runs from one edge of the first cushion sheet to the opposite edge;
   a first end of the inner chamber is closed by sewing the edges of the first cushion sheet defining the first end;
   and an inner vent hole allowing gas to pass to the first chamber and the second chamber is formed by partially sewing closed the second end of the inner chamber.

8. The airbag cushion as defined in claim 1, wherein the first chamber and the second chamber are formed by attaching a first cushion sheet forming the front portion of the airbag cushion and the inner chamber to a second cushion sheet forming the rear portion of the airbag cushion sheet;
   the inner chamber is formed by an inner cushion that crosses the inside of the airbag cushion while making a closed surface independent from the airbag cushion;

at least one of the ends of the inner cushion is attached to a portion where the first cushion sheet is attached to the second cushion sheet.

9. An airbag assembly comprising an airbag inflator and the airbag cushion defined in claim 1.

10. An steering wheel assembly comprising a steering wheel and an airbag assembly, the airbag assembly including an airbag inflator and the airbag cushion defined in claim 1.

11. An airbag cushion with multiple chambers, comprising:
- an inner chamber that is connected to directly receive inflation gas from an inflator; and
- a first chamber and a second chamber that are connected to the inner chamber respectively to receive the inflation gas from the inner chamber;
- wherein first inner vent holes and second inner vent holes having the same size are formed on the boundary of the inner chamber to supply inflation gas into the first chamber and the second chamber, respectively;
- the first chamber and the second chamber are disposed at both left and right sides of the airbag cushion; and
- the inner chamber runs from the top to the bottom of the airbag cushion between the first chamber and the second chamber,
- wherein the inner chamber is inflatable by receiving the inflation gas;
- wherein the inner chamber, the first chamber, and the second chamber are formed by attaching a first cushion sheet to a second cushion sheet to form a cushion space therein;
- the center of the first cushion sheet is recessed away from the outside of the airbag cushion to form the inner chamber such that the cushion space is divided by the inner chamber into the first chamber and the second chamber;
- the first cushion sheet overlaps between the inner chamber and the first cushion sheet such that the inner chamber is blocked from the outside, the overlapping portion of the first cushion sheet functions as a tether, and inflation height of the airbag cushion is adjusted by the length of the inner chamber and the tether; and
- an outer vent hole facing the outside of the airbag cushion is formed at a portion where the second cushion sheet contacts the inner chamber.

\* \* \* \* \*